Figure 6:
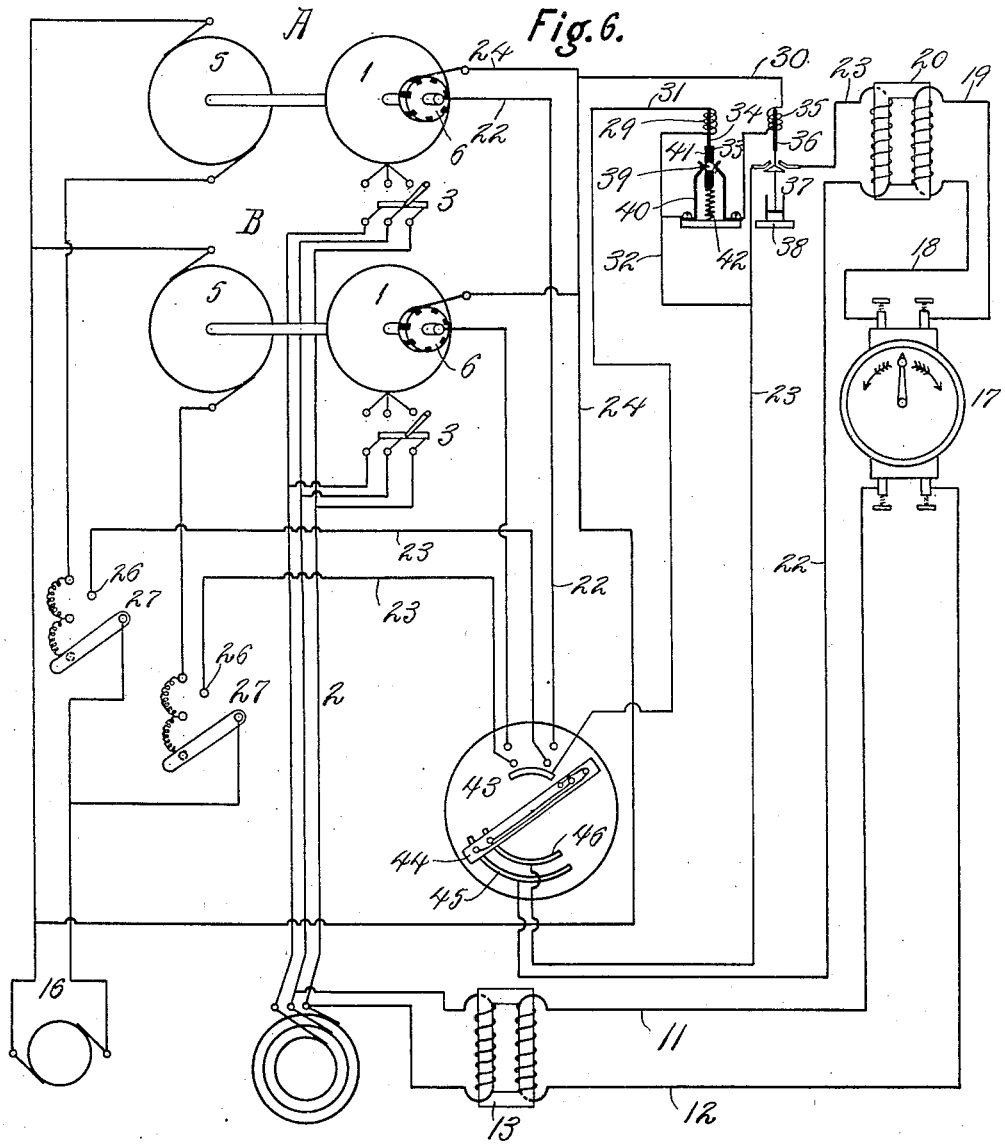

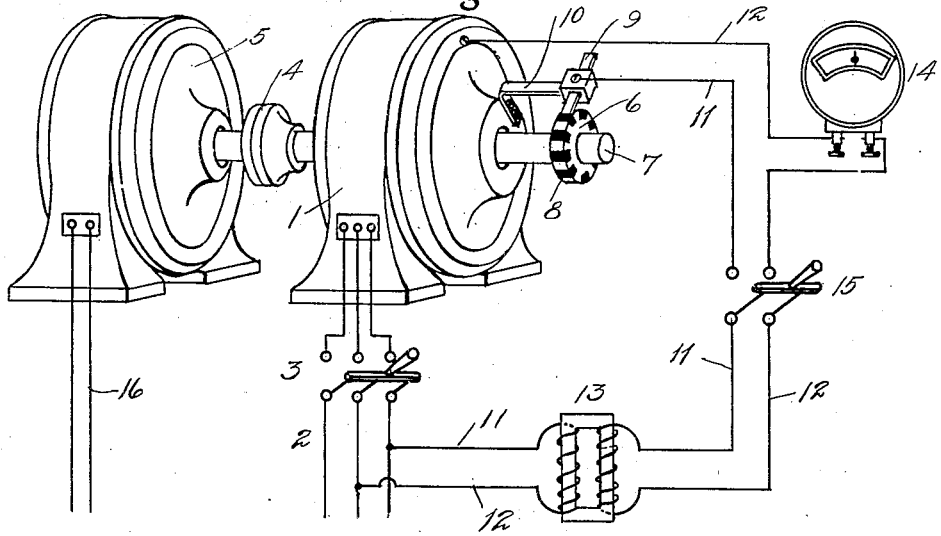
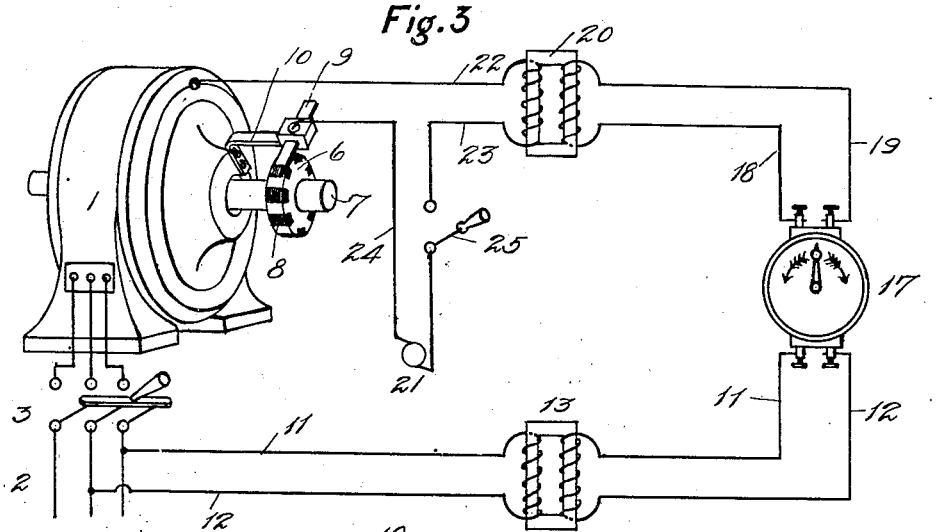
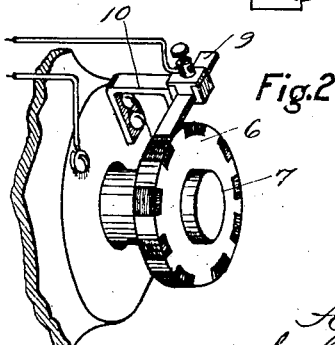

A. E. GRIFFIN.
SYNCHRONOUS SPEED INDICATOR.
APPLICATION FILED MAR. 13, 1905.
904,693.
Patented Nov. 24, 1908.
3 SHEETS—SHEET 2.
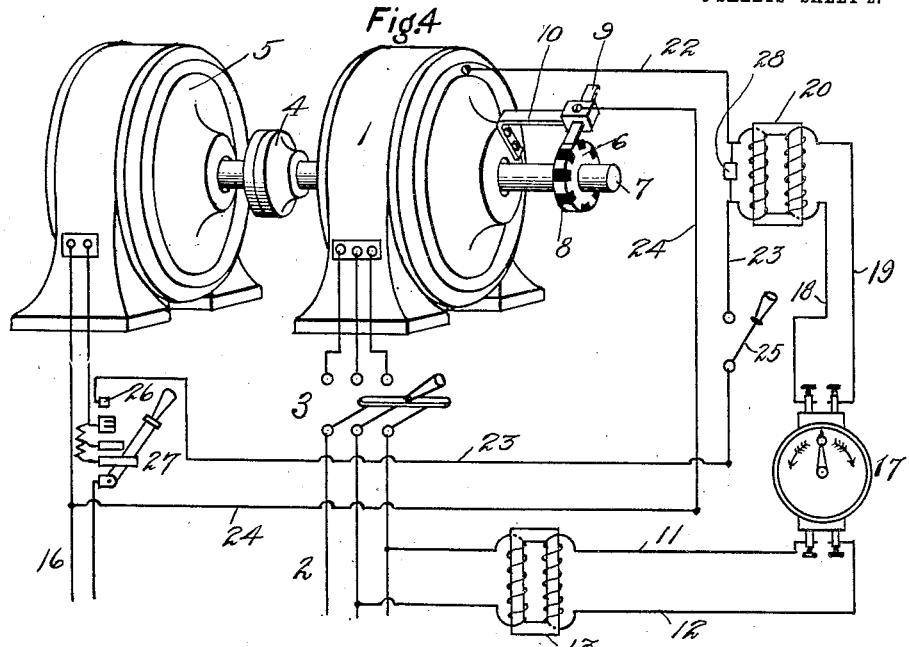
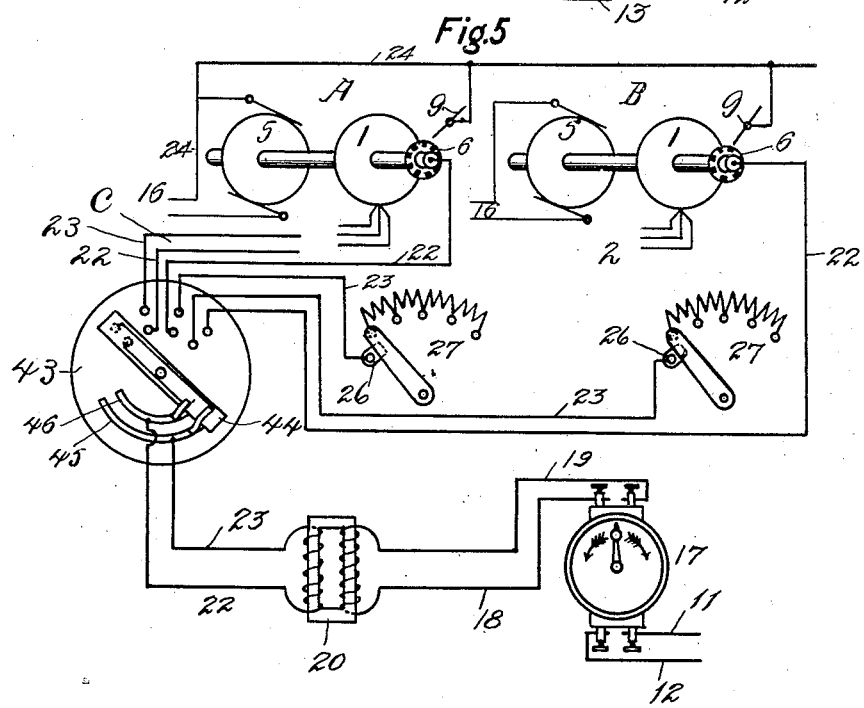
Witnesses,
John E. Porter
M. A. Jones.
Inventor:
Arthur E. Griffin
by Geo. J. Maxwell.
Attorney

A. E. GRIFFIN.
SYNCHRONOUS SPEED INDICATOR.
APPLICATION FILED MAR. 13, 1905.

904,693.

Patented Nov. 24, 1908.
3 SHEETS—SHEET 3.

Witnesses.
John E. Porter
M. A. Jones

Inventor:
Arthur E. Griffin
by Geo. H. Maxwell
Attorney.

UNITED STATES PATENT OFFICE.

ARTHUR EUGENE GRIFFIN, OF WINTHROP, MASSACHUSETTS, ASSIGNOR TO SEARS B. CONDIT, JR., OF BOSTON, MASSACHUSETTS.

SYNCHRONOUS SPEED-INDICATOR.

No. 904,693.   Specification of Letters Patent.   Patented Nov. 24, 1908.

Application filed March 13, 1905. Serial No. 249,756.

*To all whom it may concern:*

Be it known that I, ARTHUR EUGENE GRIFFIN, a citizen of the United States, residing at Winthrop, in the county of Suffolk and State of Massachusetts, have invented an Improvement in Synchronous Speed-Indicators, of which the following description, in connection with the accompanying drawings, is a specification, like letters on the drawings representing like parts.

My invention is an apparatus for indicating to the operator at the switch board or elsewhere when a given machine has reached a synchronous condition with relation to an alternating electrical circuit.

While my invention has a broad, general application in the electrical art, it is particularly adapted for use in connection with synchronizing induction motors, and accordingly I will avail myself of this illustration to make my invention clearly understood.

When it is desired to connect into the main line, one or more large induction motors without the danger of seriously disturbing the line, it becomes necessary to synchronize the speed of the motor with relation to the current in the main line, and many devices and systems have been attempted for accomplishing this result.

My invention is an indicating apparatus to enable the operator to determine the proper moment for connecting the motor into the main line.

One of my main objects is to provide indicating means which can be mounted on the switch board, or at any remote position if desired, to enable a single attendant to determine, simply by observing the indicator, the exact instant when the motor is in perfect synchronism with the line current; and, to this end, my invention has certain distinctive requirements. I provide a make-and-break device mounted on a moving part of the motor, preferably on the rotor, and connect the same in series with an indicating device in a circuit tapped from the main line beyond the main switch (*i. e.* the main switch is between the taps and the motor), so that no attention is required except the one man to view the indicator located at or near the main switch.

In the simplest form of my invention I employ an indicator in connection simply with the circuit tapped from the main line to the make-and-break device, and in such case the indicator is of that type which indicates direction of current and relative strength, such for instance as a direct current volt meter or ammeter. Under these circumstances I prefer to employ a controlling switch for said shunt circuit between the indicator and main line for giving initial certainty of operation and producing sensitive indicating. Under some circumstances, however, it is desirable to employ an indicator of that type which is dependent upon two alternating electromotive forces derived from separate sources (such for instance as a synchroscope or alternating current volt meter, or incandescent lamps), in which case I connect one side of the indicator with the circuit tapped as before from the main line and connect the other side of the indicator with an induced alternating current circuit derived from a pulsating direct current. The make-and-break device is arranged the same as before and acts to produce the pulsations required, and the induced alternations may be produced by any suitable induction device, preferably a transformer or reactive coil, so that when the frequency of said induced current becomes the same as that of the main line, and the waves of both sources have the same characteristics, as shown by the indicator, the motor is then running at synchronous speed with the main line, and the attendant thereupon closes the main switch to throw the motor into circuit with the main line.

The further details of my invention and more explicit explanation thereof will be given in connection with the accompanying drawings, in which I have illustrated various features and preferred embodiments of my invention.

In the drawings, Figure 1 is a view mainly diagrammatic, showing the simplest form of my invention, operating directly from the main line circuit only; Fig. 2 is a perspective detail of the make-and-break feature of my apparatus; Fig. 3 is a view similar to Fig. 1 showing my invention adapted to operate in connection with the second type of indicator above mentioned; Fig. 4 shows the latter construction in a more complete embodiment; Fig. 5 shows this form of my invention for indicating at the switch board in connection with any of a plurality of motors throughout the plant; and Fig. 6 is a diagrammatic view showing this application of my invention in its most complete embodiment.

In simplifying the presentation and understanding of my invention, I will describe the same first in its simplest form, as shown in Fig. 1, in connection solely with the alternating current.

The alternating current induction motor 1, which it is desired to connect into the main line, whose three feed wires are shown at 2 by a main switch 3, may be started in any well-known manner, being conventionally shown as coupled at 4 to an auxiliary motor 5.

Mounted on the motor 1, to be operated by any movable portion thereof, is a make-and-break device 6 for producing pulsations, herein shown as consisting of a commutator-like ring mounted on the rotor shaft 7 of the motor and having insulating blocks 8 embedded in said ring at equal distances apart dividing the ring into as many contact blocks as there are pairs of poles on the motor. Coöperating with this make-and-break device 6 is a brush 9 carried by a bracket 10 rigidly and preferably adjustably secured to the frame of the motor.

Tapped from the main line are wires 11, 12, a step down transformer 13 being preferably interposed for convenience of manipulation and safety to the indicator 14 which is interposed in series with one of these wires, herein shown as in the wire 12. Preferably also a switch 15 is interposed between said indicator and the main line. The indicator 14 may be a volt meter, ammeter, or any of the well known forms of devices capable of indicating the direction and strength of current flowing through it.

Let it be supposed that the parts are in the condition indicated in Fig. 1. If, now, the motor 1 be started by the auxiliary power derived from an independent source, as 16, and brought up approximately to proper speed, the operator thereupon closes the switch 15 thereby completing the shunt circuit 11, 12. As long as the pulsations set up by the make-and-break device 6 is different from the frequency of the main line, the indicator 14 will be in constant motion, but as soon as the pulsations at the make-and-break device correspond to the frequency in the main line, the pointer of the indicator 14 will give a steady deflection, thereby showing synchronous speed between the rotor of the motor 1 and the rotating field thereof or main line current. As the contact spaces of the make-and-break device correspond to the pairs of poles in the stator winding of the motor, and therefore operate to interrupt the current in the auxiliary circuit 11, 12 with a periodicity corresponding to that of the motor, it follows that the frequency of the main line, or the number of cycles per minute of its alternating current, and the interruptions produced by said make-and-break device will correspond when the motor has attained a speed in synchronism with that of the main line. Until this condition is reached, the indicator will necessarily remain unsteady, as its circuit will be completed at different points of the wave of the main line current, but the moment that the said synchronous condition is reached, the indicator will remain steady because the successive contacts of the make-and-break device will close the circuit invariably at the same points of the wave of the main line current. Hence when the indicator gives a steady deflection, the operator instantly closes the main switch 3 without danger of improper disturbance in the main line.

To adapt my invention to a wider range of indicators, such as the synchroscope and Lincoln synchronizer, I connect such an alternating current synchronizing indicator 17 on one side to the tap circuit 11, 12, as before, and connect it on the other side to wires 18, 19 from one side of a proper induction device, herein shown as a transformer 20, whose opposite winding is in series with the make-and-break device 6 and a source of direct current 21 through conductors 22, 23, 24, a switch 25 being interposed in the wire 23. As thus embodied, the operator, having started the motor as before, then closes the switch 25, whereupon the make-and-break device 6 imparts to the transformer 20 a series of pulsations which are transformed into a corresponding series of alternations for affecting the indicator in conjunction with the alternations of the tap circuit 11, 12. The one series of alternations is taken from the main line, while the other series is derived from the inductive coil or transformer 20 affected by pulsations from an independent direct current source. This enables me to show not only the moment of synchronous speed, but also the relative speed of the motor as compared with the frequency of the main line.

If the direct current circuit were left closed with an uninterrupted current, it would burn out the inductive coil or transformer and hence it is necessary to provide the switch 25. Also, to guard against improper closing of this switch, I provide an auxiliary contact 26, see Fig. 4, on the starting rheostat switch 27 of the auxiliary starting motor 5, in which case it will be understood that the direct current is supposed to be derived from the same source as the auxiliary motor circuit 16. In some instances there is danger even yet of injury to the transformer 20, as for example in case the field of the starting motor has too great initial strength, or for other reason the motor is slow, and accordingly I interpose an automatic cut out across the direct current circuit to the transformer, as indicated at 28 Fig. 4 and shown more fully in connection with the complete representation of all features of my invention, as to this type, contained in Fig. 6. This cut out or automatic transformer-protector operates to cut out the transformer at all times when the motor is running below speed.

Referring to Fig. 6, it will be seen that I have introduced a solenoid 29 in shunt across the direct current side of the transformer 20, said solenoid however also having a circuit connection 30 to the opposite terminal 24 from the make-and-break 6, the latter circuit however being normally broken and only completed when the motor 1 has reached sufficient speed for safety to the transformer. The solenoid 29 connects at one end to the wire 22 by a conductor 31 and at its other end by a wire 32 to the conductor 23. In the wire 30 is a switch 33, operated by the movement of a core 34 of the solenoid 29, and a solenoid 35 whose core 36 operates a circuit closer 37 rendered sluggish in action by any suitable means as a dashpot 38. The switch 33, as herein shown, has a movable member provided at its middle with a transverse portion 39 of conductive material and opposite end portions 41 of insulating material, said movable member operating between opposite spring contacts 40. The central part 39 provides a contact-making area, and the insulation parts 41 at the ends provide cut-out portions. It will be understood that, except as otherwise expressed in certain of my claims, any other automatic switch and circuit-closer mechanism may be employed, the electromagnet type herein shown being usually preferable.

From the foregoing description it will be understood that as the make-and-break device 6 revolves slowly at first, the current in the circuit 22, 24 reaches a maximum value each time the circuit is closed and then declines to zero as the circuit is broken, but as the speed increases, thereby increasing the frequency of the interruptions, it is accompanied by a decrease in current, due to the increased interruption and also to the impedence of the circuit which includes the coil 29, so that when the strength of current becomes just merely sufficient to be offset by the strength of the spring 42, it maintains the switch 33 closed, thereby operating the circuit closer 37 and permitting the circuit 22, 23, 24 to operate with safety to the transformer. When the make-and-break device 6 is moving slowly, it causes the movable contact maker of the switch 33 to have a long range of movement, but the momentary closing of the switch thereby does not serve to operate the circuit closer because of the dashpot 38 which prevents the latter from operating unless the contact 39 of the switch is held in closed position for an appreciable time.

And as the latter condition cannot take place until the speed of the induction motor has become sufficient to operate the transformer circuit with safety, it follows that the transformer is effectually protected by the aforesaid mechanism under all conditions.

It being remembered that one of the principal objects of my invention is to enable the attendant at the switch board to control the cutting in of the individual induction motors throughout the factory or power plant, it becomes necessary to adapt my invention to a selective system.

Referring to Figs. 5 and 6 (Fig. 5 showing the selective system simply and Fig. 6 the complete embodiment of the entire apparatus) it will be seen that I have interposed in the transformer circuit wires 22, 23 a selector 43, it being understood that any convenient form of this apparatus may be used, a usual dial switch being herein shown for the purpose, in which a centrally pivoted arm 44 carrying contacts connects at one end with sector contacts 45, 46 and at the other end with pairs of contacts for connecting up the respective induction motors A, B and so on according to the requirements of the given factory, a third set of wires C being indicated in Fig. 5 for a third motor (not shown).

By means of the foregoing mechanism it readily may be understood that the operator at the switch board simply turns the selective switch lever 44 to the contacts for any given motor, as A, and as soon as the indicator 17 notifies him that the motor has reached proper speed, he throws the switch 3 of that motor, and then shifts the switch lever 44 to the next motor B. As soon as the latter has reached proper speed, as shown by the indicator 17, he cuts it into the main line, and so on throughout the entire factory, my invention enabling the attendant to determine accurately, without leaving the switch board, the proper moment for cutting in any motor at any place in the system.

The operation of my mechanism has already been set forth in connection with the description and may, therefore, be summarized briefly.

The main switch 3 being open, as usual, the attendant watches until the induction motor 1 has attained some speed, whereupon he throws in the switch 15, Fig. 1, or the switch 25 (Figs. 3 and 4) or 43 (Figs. 5 and 6) in the other embodiments of my invention, and thereafter simply watches the indicator 14 or 17 as the case may be. In the simpler form, as shown in Fig. 1, the indicator simply moves back and forth as the make-and-break device 6 rotates, until the speed of the make-and-break device is synchronous with the main current, whereupon the indicator remains steady and the attendant is thereby notified that the time has arrived for throwing in the main switch. Substantially the same operation takes places in connection with the indicator 17, excepting that in addition to simply indicating whether the moment of synchronism has arrived, it indicates whether the motor is above or below synchronous speed; and to accomplish this result I have used the direct current for operating in connection with the make-and-break device, transforming the pulsations of said current into alternating current by means of the transformer 20 although any other means of converting the direct current into alternating current may be employed. The frequency of said transformer current depends upon the speed of the make-and-break or pulsation-producing device 6. In this form of my device the operator, after the motor has attained some speed, throws in the switch 25, or the corresponding switch 43 of the selective system, thereby guarding against usual danger; and in the most complete embodiment of my invention, as shown in Fig. 6, all danger is guarded against by the automatic transformer protector, so that it becomes immaterial when the circuit of the make-and-break device is closed.

It has been my endeavor to simplify the embodiment of my invention so far as possible so as to employ for the different parts thereof well known mechanisms, but it will be understood that various other mechanisms may be substituted and many changes may be resorted to without departing from the spirit and scope of my invention, as hereinafter expressed in the claims.

Having described my invention, what I claim as new and desire to secure by Letters Patent of the United States is:

1. The combination, with an induction motor, a source of alternating current therefor, and a source of direct current, of speed indicating means responsive to alternating current, means for influencing said indicating means from said source of alternating current, and means, including a converter for said direct current operated by said motor, for likewise influencing said indicating means.

2. The combination, with an induction motor, a source of alternating current therefor, and a source of direct current, of means visually responsive to current alternations, connections from said means to said source of alternating current, and connections from said means to said source of direct current, including means for converting the latter current into alternating current having the same periodicity as said motor.

3. The combination, with an induction motor, and its feed wires, and main switch, of a make-and-break device mounted thereon to be operated by a moving part of said motor, and a synchronous speed-indicator, included in a circuit from said make-and-break device and from said feed wires beyond the main switch, and governed by the alternations derived both from the main line source of current and from said make-and-break device.

4. The combination, with an induction motor, its feed wires, and main switch, of a make-and-break device mounted thereon to be operated by a moving part of said motor, a synchronous speed-indicator, means tapped from the main line for transmitting alternating current therefrom to said indicator, and means for transmitting induced current to said indicator from said make-and-break device.

5. The combination, with an induction motor, its feed wires, and main switch, of a make-and-break device mounted thereon to be operated by a moving part of said motor, a synchronous speed-indicator, means tapped from the main line for transmitting alternating current therefrom to said indicator, and means for transmitting induced current to said indicator from said make-and-break device, said latter means including a direct current circuit and a transformer operated thereby.

6. The combination, with an induction motor, its feed wires, and main switch, of a make-and-break device mounted thereon to be operated by a moving part of said motor, a synchronous speed-indicator, means tapped from the main line for transmitting alternating current therefrom to said indicator, and means for transmitting induced current to said indicator from said make-and-break device, said latter means including a direct current circuit and a transformer operated thereby, and a hand switch for governing said direct current circuit.

7. The combination, with an induction motor, its feed wires, and main switch, of a make-and-break device mounted thereon to be operated by a moving part of said motor, a synchronous speed-indicator, means tapped from the main line for transmitting alternating current therefrom to said indicator, means for transmitting induced current to said indicator from said make-and-break device, said latter means including a direct current circuit and a transformer operated thereby, and an automatic protector for said transformer maintaining the latter inoperative until the motor has reached normal speed.

8. The combination, with a plurality of independent induction motors and their respective switches and feed wires, of a make-and-break device for each motor, a synchronous speed-indicator, and selective means for coupling said indicator in circuit with the make-and-break device of any given motor and the feed wires thereof.

9. The combination, with an induction motor, a source of alternating current therefor, and a source of direct current, of speed-indicating means responsive to alternating current, means for influencing said indicating means from said source of alternating current, and means, including an inductive coil for said direct current pulsated by said motor, for likewise influencing said indicating means.

10. The combination, with an induction motor, a source of alternating current therefor, and a source of direct current, of speed-indicating means responsive to alternating current, means for influencing said indicating means from said source of alternating current, and means, including an inductive coil for said direct current, pulsated by said motor, likewise influencing said indicating means, and a protective switch in the circuit including said coil and said source of direct current.

In testimony whereof, I have signed my name to this specification, in the presence of two subscribing witnesses.

ARTHUR EUGENE GRIFFIN.

Witnesses:
    Geo. H. Maxwell,
    M. A. Jones.